(12) United States Patent
Dhome et al.

(10) Patent No.: US 10,225,523 B2
(45) Date of Patent: Mar. 5, 2019

(54) DEVICE AND METHOD FOR THE 3D VIDEO MONITORING OF OBJECTS OF INTEREST

(71) Applicant: COMMISSARIAT A L'ENERGIE ATOMIQUE ET AUX ENERGIES ALTERNATIVES, Paris (FR)

(72) Inventors: Yoann Dhome, Gif-sur-Yvette (FR); Patrick Sayd, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 703 days.

(21) Appl. No.: 14/783,412

(22) PCT Filed: Apr. 4, 2014

(86) PCT No.: PCT/EP2014/056781
§ 371 (c)(1),
(2) Date: Oct. 8, 2015

(87) PCT Pub. No.: WO2014/166823
PCT Pub. Date: Oct. 16, 2014

(65) Prior Publication Data
US 2016/0065904 A1    Mar. 3, 2016

(30) Foreign Application Priority Data
Apr. 11, 2013   (FR) ..................... 13 53280

(51) Int. Cl.
*H04N 7/18* (2006.01)
*H04N 13/106* (2018.01)
*G08B 13/196* (2006.01)
*G06K 9/00* (2006.01)
(Continued)

(52) U.S. Cl.
CPC ......... *H04N 7/181* (2013.01); *G06K 9/00369* (2013.01); *G06T 7/12* (2017.01); *G06T 7/75* (2017.01); *G08B 13/19608* (2013.01); *H04N 7/188* (2013.01); *H04N 13/106* (2018.05)

(58) Field of Classification Search
CPC ..................................................... H04N 7/181
See application file for complete search history.

(56) References Cited

U.S. PATENT DOCUMENTS

2012/0020518 A1*   1/2012   Taguchi ................. G06T 7/292
                                                                     382/103

FOREIGN PATENT DOCUMENTS

| EP | 1 927 947 A1 | 6/2008 |
| EP | 2 204 783 A1 | 7/2010 |
| KR | 2011 0109596 A | 10/2011 |

OTHER PUBLICATIONS

Josephine Sullivan et al., "Tracking and Labelling of Interacting Multiple Targets," ECCV 2006, Part III, LNCS 3953, pp. 619-632, 2006.
(Continued)

*Primary Examiner* — James M Pontius
(74) *Attorney, Agent, or Firm* — Baker & Hostetler LLP

(57) ABSTRACT

A device and a method for assisting security in the 3D tracking of objects of interest are provided. A proposed risk propagation module makes it possible to create kinship links between the analyzed tracks, during interactions or during disappearance/reappearance of tracks, thus making it possible to diffuse the highest risks to each track concerned.

10 Claims, 2 Drawing Sheets

(51) Int. Cl.
G06T 7/73 (2017.01)
G06T 7/12 (2017.01)

(56) References Cited

OTHER PUBLICATIONS

Raina Y. Khalaf et al., "Improving Multiple People Tracking Using Temporal Consistency," Massachusetts Institute of Technology, Technical Report, Jul. 2001.
Bi Song et al., "Stochastic Adaptive Tracking in a Camera Network," Department of Electrical Engineering, University of California, Riverside.

* cited by examiner

DEVICE AND METHOD FOR THE 3D VIDEO MONITORING OF OBJECTS OF INTEREST

CROSS-REFERENCE TO RELATED APPLICATIONS

This application is a National Stage of International patent application PCT/EP2014/056781, filed on Apr. 4, 2014, which claims priority to foreign French patent application No. FR 1353280, filed on Apr. 11, 2013, the disclosures of which are incorporated by reference in their entirety.

FIELD OF THE INVENTION

The invention relates to the field of security systems and is concerned more particularly with systems for 3D video tracking of objects of interest, the objects of interest notably being able to be people or vehicles.

BACKGROUND

The development of systems for assisting security attempts to address the need to secure numerous critical infrastructures with the aid of spot control spaces. To optimize these systems, current studies favor multiplication of the detectors making it possible to cover a wide spectrum of dangerous substances or elements. However, the sensitivity and specificity of detectors make it necessary to aggregate their alarms so as to yield robust and reliable analysis elements. Within this framework, numerous systems for assisting security integrate a module for 3D video tracking of people allowing them to merge possible alarms corresponding to one and the same person. The tracking module makes it possible to track each person present in the secure zone, and therefore makes it possible to associate each alarm arising from a sensor with a tracked person. Thus it is possible to aggregate several detections with one and the same person over time and to strengthen the assumption of danger up to a probability which is sufficient to forewarn a security operator.

However, modules for tracking people offer limited reliability and may fairly easily confuse two people when they interact, crossing one another, walking in proximity, sometimes facing one another.

To alleviate this problem, two known approaches exist to date.

The first approach consists in arranging matters such that the people present in the zone secured by the control system remain well separated so as to avoid situations of interactions or potential errors for the tracking modules. Thus, patent EP 2 204 783 A1 from Thales proposes a security system where a single person must pass through a security corridor. This solution is viable in a very constrained context, this being less and less accepted by operatives.

The second approach consists in carrying out long-term probabilistic analyses based on various criteria regarding appearances and/or morphologies, so as to attempt to recognize the various people that have interacted once they have been separated. Several known algorithms make it possible to manage multiple assumptions, so as not to take an immediate decision to associate the detections of people with a track, a track being associated with a series of positions of people in space and time, and then to wait to have sufficient elements to confirm or deny the pairings between tracks and detections. Thus, the article by B. Song and A. K. Roy-Chowdhury entitled "*Stochastic Adaptive Tracking In A Camera Network*", or the article by R. Y. Khalaf and S. S. Intille entitled "*Improving multiple people tracking using temporal consistency*" propose variants around this principle. The drawback of this so-called "probabilistic analyst" approach is that it integrates uncertainty and doubt. It does not therefore integrate the specific constraints of security systems in terms of reliability.

However, the reliability of a security system presupposes that the latter must have a rate of non-detection of danger that is almost zero.

Thus, existing solutions do not address the recent problematic issue posed by new security assistance systems. To address recent requirements for securing critical infrastructures, these systems may not impose the constraint of perfect separability of people in secure zones, both in respect of hardware constraints (with the need for numerous operators to control circulation or for physical barriers) and in respect of constraints of operability of these systems.

Thus the need exists for a solution which alleviates the drawbacks of the known solutions.

The present invention addresses this need.

SUMMARY OF THE INVENTION

An object of the present invention is to propose a system for assisting security which comprises a robust and reliable module for 3D video tracking of objects.

Another object of the present invention is to provide a device for propagating risks which makes it possible for the potential risks associated with a person not to be lost or associated with another person over time.

The proposed risk propagation module makes it possible to create kinship links between the analyzed tracks, during interactions or during disappearance/reappearance of tracks. It thus makes it possible to diffuse the highest risks to each track concerned.

Another object of the present invention is to propose a simple and reliable method of real-time use. The scheme of the invention makes it possible to strengthen the reliability of a system for aggregating alarms arising from various sensors and makes it possible to limit non-detections of security assistance systems.

Another advantage is the taking into account by the module of the limits of the algorithms for tracking objects within the framework of a security system with specific constraints. Taking these specific constraints into account permits a rate of non-detection of danger that is almost zero.

Advantageously, the device of the invention is based on a new interpretation of the need in terms of 3D video tracking of objects of interest within the framework of a critical infrastructure security system, contrary to the existing solutions which are concentrated on the improving of the tracking algorithm, while greatly complicating the calculations, or while delaying decision taking so as to have more information, but doing so at the price of some difficulty in upholding the real-time constraint arising from the data merging.

Advantageously, the method of the invention detects potentially tricky situations, i.e. interactions (people crossing one another, walking in proximity, sometimes facing one another) or disappearances/reappearances of tracks. To detect these situations, the proposed method continuously evaluates the proximity between the various tracks as well as their capacities to mask one another from the viewpoint of the cameras for a tracking algorithm, and then the method makes it possible to diffuse to all the tracks concerned the highest risk possessed by one of them.

Still advantageously, the method of the invention makes it possible to create a kinship between tracks that have interacted and that are therefore liable to have been confused by the people tracking algorithm, thus creating an item of information corresponding better to the needs of supervision systems.

Moreover, the scheme of the invention offers the possibility of using various criteria to determine an interaction between tracks.

The proposed risk propagation system covers the field of security assistance systems including a video system and more broadly the videosurveillance sector. It can be used in conjunction with any security-related information merging system, including a step of 3D video tracking of people.

Advantageously, the present invention proposes a method for assisting security in the 3D tracking of objects of interest, the method comprising the steps of:

calibrating with respect to a common reference an assembly of detectors of a tracking system for a space to be monitored;

defining, for the monitored space, at least one competence zone;

generating, for the competence zone, a list of tracks, each track comprising, for a tracked object of interest, a label identifying the tracked object of interest and a set of positions provided by the detectors;

detecting interactions between the tracks over the competence zone; and creating a kinship label on the basis of the labels identifying each object of interest tracked for the tracks detected during interaction.

Advantageously, the competence zone is associated with an entrance-exit zone of the monitored space and with one or more overlap zones.

Advantageously, the method makes it possible to define interactions between tracks, by a proximity parameter, or by a masking parameter.

In a particular implementation, the step of detecting interactions consists in determining the repeated presence of a track in the ground projection ellipse of another track and the repeated masking between these same tracks.

Advantageously, the detectors are of the radiometric sensor, metallic detector, explosive trace detector, biological detector and/or epidemiological detector type.

In one mode of operation, the step of kinship label creation comprises the steps of:

deleting, from the list of tracks, the two tracks of the detected interaction between two objects of interest;

creating a new common track for the tracking of the two objects of interest during interaction; and associating an interaction label with the common track, the interaction label representing the two tracks deleted in the genealogy of the common track.

The step of kinship label creation moreover comprises the steps of:

creating, on the basis of the common track, two new individual tracks for tracking each of the two objects of interest;

deleting the common track; and incorporating the label of the deleted common track into the genealogy of each of the two individual tracks, the positions, identified by the tracking system, of the two objects of interest being associated with the resulting labels.

The method of the present invention is operative in respect of a device for assisting security in the tracking of objects of interest, the device comprising means for implementing the steps of the method.

Advantageously, the steps of the method can be implemented in the form of a computer program comprising code instructions for performing all or some of the steps of the method.

BRIEF DESCRIPTION OF THE DRAWINGS

Various aspects and advantages of the invention will become apparent in support of the description of a preferred but nonlimiting mode of implementation of the invention, with reference to the figures hereinbelow.

DETAILED DESCRIPTION

Figure 1:
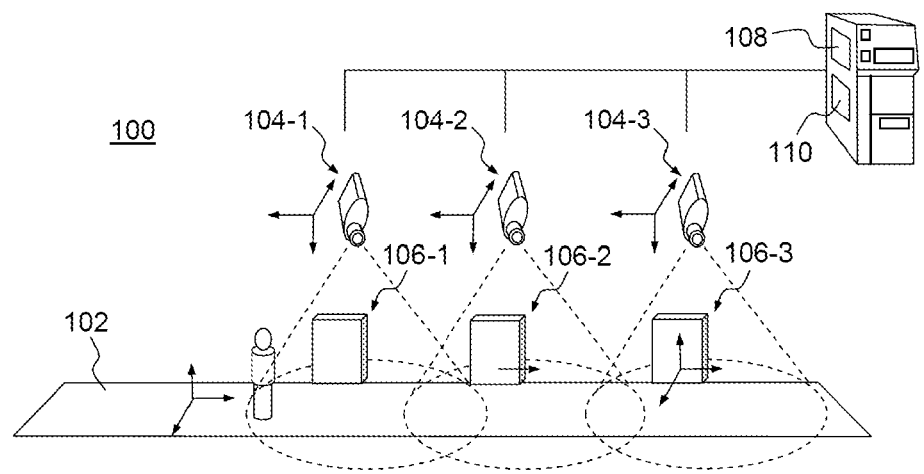
FIG. 1 illustrates in a schematic manner a system for assisting security making it possible advantageously to implement the device of the invention.

FIG. 1 illustrates a known system for assisting security in which to advantageously implement the device of the invention. Only the principal elements of such a system are illustrated, but the person skilled in the art will appreciate that any variant of these elements does not change the functional principle of the invention. Thus for the sake of clarity of the description, the architecture shown is composed of a limited number of cameras and of sensors. In the example described, three cameras (104-1, 104-2, 104-3) and three chemical sensors (106-1, 106-2, 106-3) are placed along a corridor (102) where people can circulate. It should be noted that the number both of sensors and of cameras may be different depending on the need of the monitoring system, without any impact on the manner of operation of the device of the invention, likewise the geometry, the size of the corridor.

The positioning of the cameras which is presented in FIG. 1 illustrates a particular and nonlimiting case, the cameras being able to be positioned differently. For example, instead of utilizing a viewpoint "viewed from the sky", it is possible to place the cameras in such a way as to obtain a viewpoint utilizing the perspective in relation to the length of the corridor or on the contrary in relation to the width thereof. Likewise, it is possible to use cameras with very different objectives ranging from the "fish-eye" (very short focal length) to so-called "pin-hole" objectives (longer focal length).

Likewise, the system of the invention can operate with security detectors of any type, such as radiometric sensor, metallic detector, or else explosive trace detector, biological detector or even epidemiological detector.

The monitoring system moreover comprises a module (108) for processing the data arising from the sensors and cameras. The data processing module (108) comprises an algorithm for tracking people. The tracking algorithm delivers a list of tracks associating a series of positions of the objects or people tracked in space and time as well as optionally a volume representing the tracked object.

A device for propagating risks (110), subject of the present invention, is coupled to the assistance system, and more particularly to the data processing module (108).

The device operates on the basis of several types of data:
calibration data;
mapping data; and
rules defining interactions between tracks.

The whole system of sensors and cameras is calibrated so that each element is positioned in space with respect to a common reference. The calibration makes it possible to project into one and the same common space, the corridor in the example described, the zone observed by the cameras and monitored. The calibration makes it possible to ascertain the position in the corridor of all the objects (people, cameras, sensors) with respect to a common reference (the entrance of the corridor for example). The calibration thus makes it possible to make the link between the fields of view of the cameras so as to facilitate the interpretation of the images.

Thus, in the example of FIG. 1, an individual leaving on the right the field of view (FV1) of the first camera (104-1), will appear on the left in the field of view (FV2) of the second camera (104-2). Advantageously, the inter-camera people tracking algorithm takes this assumption into account to optimize its performance.

In a similar manner, a detection arising from the first sensor (106-1) can be connected with a track arising from the tracking carried out on the basis of the images of the first camera (104-1).

Advantageously, the calibration data also make it possible to carry out a tracking of people in 3D by modeling the people as cylinders. However, any other more or less complex geometric shape judiciously representing the object or the person of interest tracked could be used, or also blocks.

Figure 2:
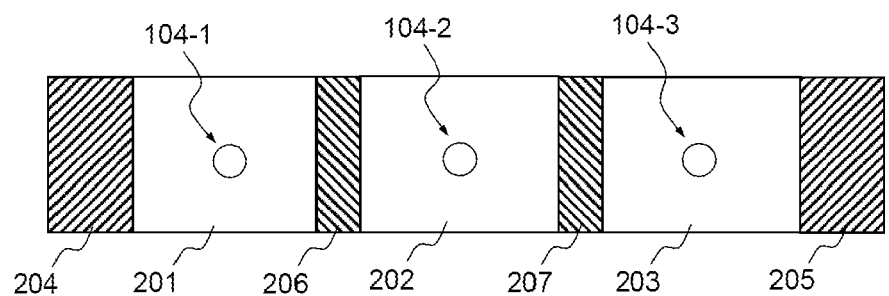
FIG. 2 is an illustration of a mapping of a zone to be monitored.

FIG. 2 illustrates in a schematic manner a mapping of a space monitored so as to operate the device of the invention. The monitored space is divided into various zones. In the example illustrated, a competence zone (201, 202, 203) is specified. The competence zone is associated with an entrance-exit zone (204, 205) of the monitored space and with one or more overlap zones (206, 207) corresponding to inter-camera entrances-exits. Any other definition of the zones, such as the definition of a single competence zone covering the whole corridor makes it possible to operate the device of the invention according to the same principles.

Advantageously, the definition of a mapping makes it possible to limit the image processing to the zones defined and to facilitate the detection of potential interactions between tracks arising from the 3D tracking.

As mentioned above, the device of the invention operates according to rules defining interactions between tracks. The device for propagating the risks makes it possible to create kinships between tracks when an interaction between tracks is substantiated. A certain number of criteria make it possible to define a "substantiated interaction".

A first criterion is "proximity". The perspective effect in a camera renders the uncertainty around the position of a person modelable by a ground ellipse whose principal axis represents the axis between the person and the camera and whose secondary axis represents the width of the person. Within this framework, the calibration data make it possible to pass from information in the image to 3D data such as the ground location, the distance from the camera, the size of the person. A criterion indicating the proximity between two people can be determined by superposition of their respective ellipses. A superposition threshold makes it possible to define the magnitude of this overlap in order to be relevant. It should be noted that other criteria can be used to detect proximity.

Another criterion is "masking". In a known manner, it is customary to model a person by a cylinder within the framework of a tracking algorithm, so as to have a model that is simple to utilize. Thus a criterion indicating the masking of one person by another can be determined by the superposition of their cylinders from the viewpoint of the camera. A threshold makes it possible to define the magnitude of this overlap in order to be relevant. Again, advantageously, the calibration information makes it possible to pass from 3D data to 2D data. It should be noted that other criteria can be used to detect masking.

The person skilled in the art will understand that other parameters could be used depending on needs and context. For example, proximity of appearance. Indeed, a visual tracking system is sensitive to appearance. It is difficult to differentiate without error two people dressed in a similar manner or two cars of the same color or same model.

Another parameter that may be used is the "certainty". Indeed, certain tracking systems are capable of describing the certainty or reciprocally the uncertainty of positioning of a person.

Another parameter that may be used is the "convergence of the trajectories" for fluid situations for trajectories which approach one another, cross one another and then move apart.

Figure 3:
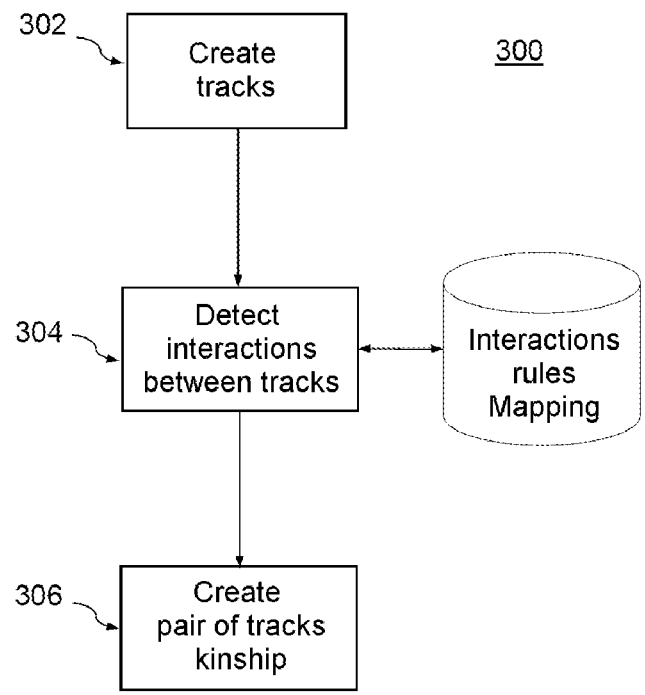
FIG. 3 shows the steps of the process for propagating risks according to the principle of the invention.

FIG. 3 shows the steps of the process (300) of risk propagation the risks according to the principle of the invention. As mentioned previously, the risk propagator is designed to alleviate the weaknesses of a system for 3D video tracking of objects of interest, and operates in several steps.

The initial step (302) consists in creating the tracks, i.e. for a track, in determining the series of positions in space and over time of a tracked object.

In the following step (304), the process determines the interactions between the tracks created in the previous step. In an advantageous manner, to obtain a reliable and relevant response, the process temporally aggregates the interaction criteria which are defined beforehand to determine the existence of an interaction between tracks. In a preferential implementation, an interaction is determined by the repeated presence of a track in the ground projection ellipse of another track, this combined with a likewise repeated phenomenon of masking between these same tracks.

In this step, the process also takes into account the mapping which was defined beforehand so as to exclude certain zones from the analysis, such as for example the global entrance/exit zones. Indeed in these zones, the lack of reliable data makes it impossible to interpret the scene sufficiently finely to derive the information required by the interaction rules.

Figure 4:
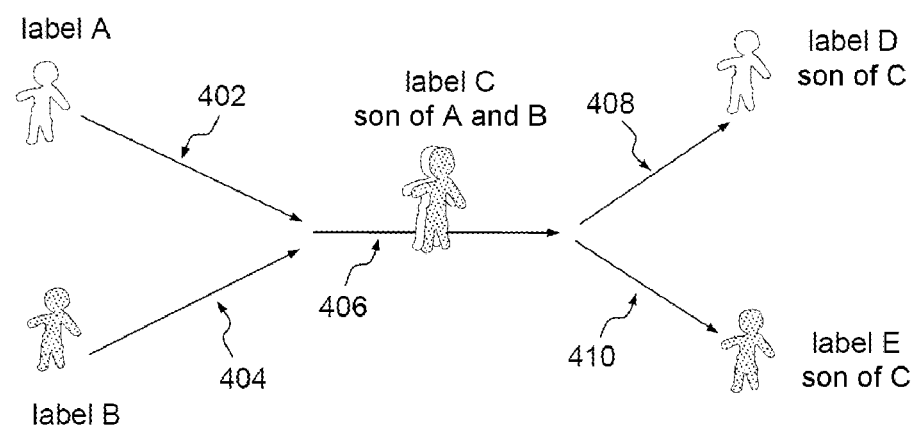
FIG. 4 is an illustration of the process for creating kinship links.

When an interaction is detected, the process passes to the following step (306) to activate the creation of kinship. FIG. 4 is an illustration of the kinship links creation process.

The creation of kinship occurs twice. A first time at the start of the interaction between tracks, and a second time at the end of the interaction.

The first creation of kinship consists of the execution of the following actions:
deletion of the two tracks (402, 404) of the interaction detected between two people or objects of interest, labels being assigned to each person (label A, label B);
creation of a new track (406) charged with tracking the two people equally; and
incorporation of the labels representing the two deleted tracks into the genealogy of the new track (label C, son of A & B).

The second creation of kinship occurs at the end of the interaction, and consists of the execution of the following actions:

creation of two new tracks (408, 410) charged with tracking the two people or objects of interest;

deletion of the old track (406) charged with tracking the two people equally;

incorporation of the label representing the deleted track (406) into the genealogy of each of the two new tracks (label D, son of C) and (label E, son of C). The new positions identified by the tracking system are associated with the resulting labels (D, E).

To summarize, certain advantages of the present invention are:

that the systems for assisting security are more reliable and robust;

that the resolution of the pairing between tracks and the detection of people are fast and viable for real time;

that a certain independence is created between the performance of the people tracking algorithm and that of the overall data merging system.

The person skilled in the art will appreciate that variations may be made to the system and the method described in a preferential manner, while maintaining the principles of the invention.

The present invention may be implemented on the basis of hardware elements and/or software elements. It may be available as a computer program product on a computer-readable medium.

Thus the present description illustrates a preferential implementation of the invention, but is not limiting. An example has been chosen to allow a proper understanding of the principles of the invention, and a concrete application, but it is in no way exhaustive and should allow the person skilled in the art to make modifications and variants of implementation while retaining the same principles.

The invention claimed is:

1. A method for assisting security in the 3D tracking of objects of interest, the method comprising the following steps:

calibrating with respect to a common reference an assembly of detectors of a tracking system for a space to be monitored;

defining, for the monitored space, at least one competence zone;

creating for the at least one competence zone a list of tracks, the list of tracks comprising a track for each object of interest, wherein each track comprising a label identifying the object of interest and a series of positions of the object of interest provided by the detectors throughout the at least one competence zone;

detecting interactions between tracks over the competence zone; and when an interaction between tracks of different objects of interest is detected, creating a kinship label, the kinship label being generated on the basis of the labels identifying each object of interest of the tracks detected in interaction.

2. The method as claimed in claim 1, wherein the at least one competence zone is associated with an entrance-exit zone of the monitored space and with one or more overlap zones.

3. The method as claimed in claim 1, further comprising a step of defining the interactions between tracks.

4. The method as claimed in claim 3, wherein the interactions between tracks are defined by a proximity parameter.

5. The method as claimed in claim 3, wherein the interactions between tracks are defined by a masking parameter.

6. The method as claimed in claim 1, wherein the step of detecting interactions consists in determining the repeated presence of a track in the ground projection ellipse of another track and the repeated masking between these same tracks.

7. The method as claimed in claim 1, wherein the detectors are of the radiometric sensor, metallic detector, explosive trace detector, biological detector and/or epidemiological detector type.

8. The method as claimed in claim 1, wherein the step of kinship label creation comprises the steps of:

deleting, from the list of tracks, the two tracks of the detected interaction between two objects of interest;

creating a common track for tracking during all the interaction both objects of interest involved in the during interaction; and associating an interaction label to the common track, the interaction label representing the genealogy of the common track for the two objects of interest.

9. The method as claimed in claim 8, wherein the step of kinship label creation further comprises at the end of the interaction the steps of:

creating, on the basis of the common track, two new individual tracks for tracking each of the two objects of interest;

deleting from the list of tracks the common track; and associating a new label to each object of interest, each new label identifying the object of interest and representing the genealogy of each individual track, thereby the positions of each object of interest identified by the tracking system, being further associated with the respective new label.

10. A computer program product stored on a non-transitory computer-readable medium, said computer program product comprising code instructions to perform all or some of the steps of the method as claimed in claim 1, when said program is executed on a computer.

* * * * *